Patented Apr. 21, 1936

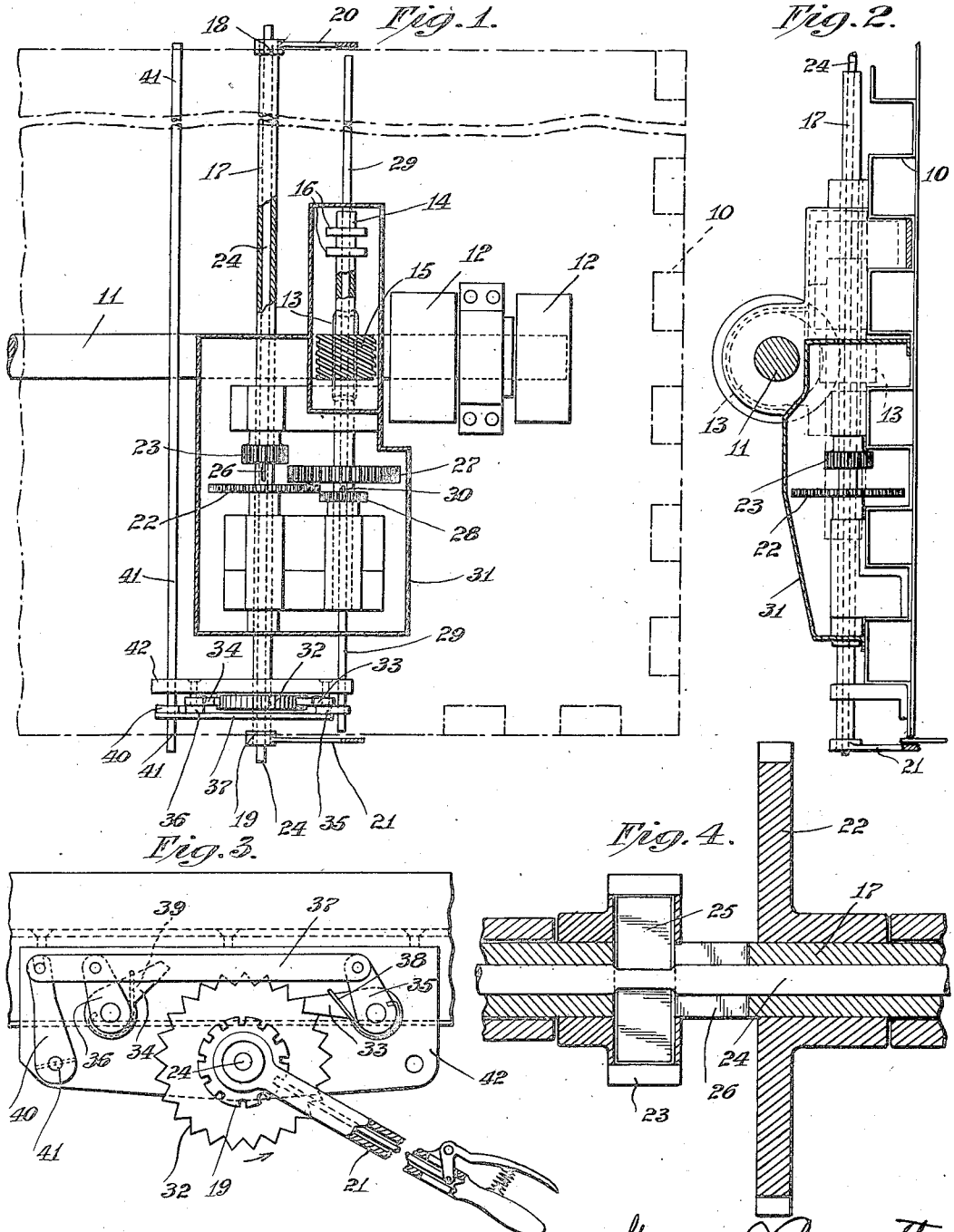

2,037,700

UNITED STATES PATENT OFFICE 2,037,700

LESS THAN CARLOAD FREIGHT CONTAINER

George L. Bennett, Terre Haute, Ind.

Application November 10, 1933, Serial No. 697,444

9 Claims. (Cl. 280—3)

The invention relates to a less than carload freight container, and more particularly to the driving mechanism by which manual power may be applied to the traction wheels of the container in a manner to permit its operation at different speeds, or be disconnected from the traction wheels in a manner to permit the towing of the container by means of a tractor or other engine in a warehouse or factory.

A wheeled container of the type above referred to is particularly desirable because it may be readily moved upon its own wheels when loading or unloading from a flat car, either from a loading platform or a truck, and also it may be readily moved to and from a truck to the floor or loading platform of a warehouse or factory. Furthermore, it may be readily towed about a warehouse or factory by a tractor or other engine, thus greatly facilitating the charging of the container with merchandise or the discharging of merchandise therefrom.

Such containers, when fully loaded, may weigh several tons, and since they are designed to be moved by the application of manual power thereto, it is essential to provide a driving mechanism so constructed as to be capable of developing the necessary power to readily move the container under all conditions of use.

Such containers are required not only to move along flat surfaces, but to move up and down inclines, so that it is necessary to provide a driving mechanism which may not only be adapted to the various conditions which may be met with at different localities where the container is, but it must also be so constructed as to permit the container to be moved by a tractor or other engine without interference from the driving mechanism.

In securing the desired condition, I provide a low speed power transmission mechanism embodying therein a change speed gearing which may be so set as to control the power applied to the traction wheels, or permit said traction wheels to run free of the variable speed transmission mechanism through which power is applied to said wheels.

By providing each container with its own driving mechanism, it is possible to use less than carload freight containers for delivery points where cranes, derricks or other mechanisms commonly used in handling such containers are not available, and at the same time to permit the convenient movement of the containers to and from trucks.

The actuating means of the driving mechanism are arranged at the opposite ends of the container where they will be conveniently accessible to the men engaged in loading and unloading or otherwise moving the containers, the variable speed gearing being provided with actuating means which are also conveniently accessible from the opposite ends of the container.

I also provide means adapted particularly to be used when moving the container up an incline, by which the gearing transmitting power to the traction wheels may be utilized to hold the container against reverse movement. Actuating means, however, must be relied upon to prevent the development of momentum when passing down an incline.

The change speed gearing is also so constructed that it may be utilized to effectively lock the wheels, which is particularly desirable when transporting a container or containers upon trucks between a railroad freight station and the ultimate point of destination of the container.

The invention consists primarily in a less than carload freight container embodying therein driving wheels, an axle therefor, a worm gear carried by and rotatable with said axle, a shaft, a worm thereon enmeshed with said worm gear, a power shaft projecting beyond one end of the container, a gearing connecting said power shaft with said worm shaft, means whereby said gearing may be actuated to disconnect said power shaft from said worm shaft, a lever handle idly mounted upon said power shaft, and a clutch mechanism whereby said lever handle may be alternately connected with, and disconnected from, said power shaft and permit manual power in succeeding impulses to be applied to said shaft; and in such other novel features of construction and combination of parts as are hereinafter set forth and described and more particularly pointed out in the claims hereto appended.

Referring to the drawing,

Fig. 1 is a condensed longitudinal view of a portion of a container, shown in dotted lines, embodying the driving mechanism of the invention;

Fig. 2 is a longitudinal section of the driving mechanism adjacent one end thereof and the change speed gearing;

Fig. 3 is a view on a larger scale of one end of the power shaft and its appurtenances; and Fig. 4 is a fragmentary portion, shown partly in section, of a part of the gear shift mechanism.

Like numerals refer to like parts throughout the several views.

In the embodiment of the invention shown in the drawing, the body of the container is shown in dot and dash lines at 10. Mounted in suitable bearings and carried by the underframe of the container is an axle 11 carrying traction wheels 12. Only one set of said wheels is shown, it being understood that similar wheels are positioned toward opposite sides of the container, these wheels being so positioned as to ensure the major portion of the load of the container being carried thereby.

The axle 11 carries a worm gear 13. Extending at right angles to the axle 11 is a hollow shaft 14 carrying a worm 15 enmeshed with the worm gear 13.

At 16 I have shown suitable thrust bearings for the hollow shaft 14.

The worm gear 13 and its co-operating worm 15 are of a pitch to permit overhauling of said worm gear when the container is moving upon its wheels under power other than that applied through said worm. The term "overhauling" is used to mean that the worm gear has no locking effect upon the worm shaft and the shaft may therefore be turned when power is applied thereto by the worm gear upon said axle.

Power is applied to the shaft 14 through a power shaft 17 provided at its opposite ends with clutch disks 18 and 19. Adjacent said clutch disks at the opposite ends of this shaft are idly mounted long actuating levers 20 and 21, provided respectively with means adapted to be engaged with, or disengaged from, the clutch disks 18 or 19 so as to permit the intermittent application of power to said shaft 17 in either direction.

The shaft 17 is connected with the shaft 14 by a change speed gearing having two speeds. This change speed gearing consists of a large spur gear 22 permanently attached to the shaft 17, and a small sliding gear 23 keyed to a shift rod 24 slidably mounted in the hollow shaft 17, and splined to said shaft by means of a feather 25 carried thereby and passing through a slot 26 in said shaft 17.

The hollow shaft 14 carries a large gear 27 with which the gear 23 is adapted to be enmeshed when it is desired to operate a container at low speeds. A small gear 28 is slidably mounted upon the shaft 14 and keyed to a shift rod 29 mounted within said shaft 14. The gear 28 is secured to the rod 29 in the same manner as is illustrated in connection with the gear 23, Fig. 4, and is provided with a feather passing through the slot 30 in the shaft 14.

The small gear 28 is adapted to be moved into or out of mesh with the gear 22 when it is desired to operate the container at a higher speed than that resulting from the enmeshment of the gears 23 and 27.

The rods 24 and 29 extend from end to end of the container to a point where the ends are readily accessible to effect the desired shifting of either gear 23 or 28 by the workman who is actuating the handle 20 or 21.

The gear shift mechanism described is enclosed in a housing 31, it being desirable to have these gears run in oil as with ordinary change speed gearing commonly used in automobiles.

The power shaft 17 adjacent one end thereof is provided with a double acting ratchet wheel 32 co-operating with which are two oppositely set spring actuated detent pawls 33 and 34, the pivots of which pawls carry crank arms 35 and 36 respectively, connected with a cross link 37. These arms are substantially parallel so that when one hold-back or detent pawl is engaged with the ratchet 32, the other pawl will be disengaged from said ratchet. The springs 38—39 acting upon the detent pawls 33 and 34 respectively are connected with the pivots carrying the arms 35 and 36, thus permitting movement of said pawls independently of said arms. There is a pivotal connection between the link 37 and the arms 35 and 36 respectively. One end of the link 37 is connected with a crank arm 40 carried by a shaft 41 extending from one end of the container to the other so as to be readily accessible to the man using the hand levers 20 or 21 in order to determine the direction of movement of the shaft 17 with oscillations of the hand levers or either of them. The pawl and ratchet mechanism above described is carried by a plate 42.

The operation of the herein described mechanism is substantially as follows:—

The gear ratios and the length of the lever handles 20 and 21 are such that the estimated normal manual power which may be applied to the lever will propel the container at a speed of nine to ten feet per minute, up a 10% grade when the gears 22 and 28 are enmeshed, and up a very much steeper grade at a lower speed when the gears 23 and 27 are enmeshed.

The high pitch of the teeth upon the intermeshing worm 15 and worm gear 13 avoids the self-locking characteristic commonly found in worm gearing, it being necessary to permit overhauling of the gear 13 when the container is being towed.

Since the application of power to the shaft 17 is through a clutch mechanism, it must be alternately set and released. This condition would result in the container running or backing down an incline when the clutch mechanism connecting the hand lever with the power shaft is released, if means were not provided to prevent reverse movement of the power shaft during this interval. The pawl and ratchet mechanism described is for the purpose of holding the power shaft against this reverse movement, such holding of the power shaft, through the gearing connecting it with the shaft 14, ensuring the control of the shaft 14 through the power shaft 17.

The construction of the gearing is such as to enable four conditions in the setting of the controls of the container. The first of these is a complete disconnection of the power shaft from the shaft 14 by moving the small gears 23 and 28 out of mesh with the larger gears 27 and 22 respectively. With this setting, the axle 11 is free to turn, as when the container is being towed, the intermeshing worm gear 13 and worm 15 causing the shaft 14 to run idly. By enmeshing both small gears 23 and 28 with the large gears 27 and 22, the shaft 14 may be locked against all movement and power cannot be applied to the power shaft 17. By enmeshing the small gear 28 upon the shaft 14 with the large gear 22 upon the power shaft 17, the container may be propelled by the application of power to said shaft 17 at the highest speed which the driving mechanism is capable of developing, it being understood that the gears 23 and 27 must be out of mesh when the gears 28 and 22 are enmeshed. By disengaging the gears 22 and 28 and enmeshing the gears 23 and 27, the vehicle may be propelled at the lowest speed which the mechanism is capable of developing.

Assuming that it is desired to move the vehicle in a direction toward the top of the sheet of drawings, Fig. 1, a clutch mechanism including the clutch disk 18 or 19 is set so as to connect the handle 20 or 21 with the shaft 17 and the workman, by moving a lever 20 or 21 turns the power shaft 17 a part of one revolution, causing actuation of the shaft 14 and the worm 15 carried thereby, and turning the axle 11 in the required direction through one pair of intermeshing gears. Upon the completion of approximately 90° of movement of the lever, the workman disconnects the clutch mechanism and restores the lever to its former position.

During the turning of the shaft 17, the ratchet wheel 32 receives a contra-clockwise movement, as shown in Fig. 3, the pawl 33 riding upon the teeth of said ratchet wheel and holding it and the shaft 17 against reverse movement following the release of the clutch and during return oscillation of said hand lever.

If it be desired to move the container in the opposite direction, the workman by the use of the rod 41 rocks the arm 40, thus disengaging the pawl 33 from the ratchet wheel 32 and engaging the pawl 34 therewith. This results from the movement of the link 37 by the crank 40 and rod 41 which imparts rocking movement to the cranks 35 and 36 and to the pawls 33 and 34 respectively.

As heretofore noted, the pawls 33 and 34 may have movement against the tension of their springs independently of any movement of the cranks 35 and 36, said pawls being idly mounted upon the shafts carrying said cranks, co-operating means being provided to permit this movement of the pawl independently of said arms while ensuring movement of the pawls with the arms upon the actuation of the link 37 as shown in Fig. 3. This pawl action is old and well known, however.

The rods 24 and 29 permit the small gears 23 and 28 to be moved along the hollow shafts 17 and 14 respectively, since, as stated, these gears are secured to said rods 24 and 29 and are connected with said hollow shafts by feathers passing through slots therein.

The container may be moved in either direction by workmen at either or both ends thereof. In going down a steep incline, it is desirable to have a workman operating each of the handles 20 and 21, thus permitting a continuous control of the power shaft, since one workman can use his lever to hold said shaft against movement while the other workman is releasing the clutch and resetting it preparatory to the next impulse to be applied to said shaft. When moving the container down an incline, it is necessary for the workmen to hold the shaft 17 against movement through the shaft 14, while in moving the container up an incline or along a level flooring, power must be applied to said shaft 17.

Long rods 24, 29 and 39 are used so as to permit the actuation of these rods from either end of the container, it being understood that the containers are frequently so positioned as to prevent free access thereto and, under some conditions, they may be required to be handled by only one man.

The levers 20 and 21 should be so mounted as to prevent their removal from the container, since in hauling containers from one destination to another they may be moved from flat cars at small way stations where the absence of extra equipment might result in difficulties and delays in the handling of the containers. It is therefore desirable that all of the equipment necessary for the handling of such containers be included in the container equipment at all times, so as to avoid a loss of any of the operating parts during transportation which might occur if such parts were detachable.

It will be noted that the change speed gearing connecting the power shaft 17 with the shaft 14 is a reversible gearing, since it may be required to impart movement to the container in either direction. It will also be noted that this gearing may be so set as to secure a high or low speed in either direction in which the container may be driven. Under the conditions present with a driving mechanism for use with such a container, no reversing mechanism is required.

It is not my intention to limit the invention to the precise details of construction shown in the drawing, it being apparent that such may be varied without departing from the spirit and scope of the invention.

Having described the invention, what I claim as new and desire to have protected by Letters Patent, is:—

1. A less than carload freight container embodying therein driving wheels, an axle therefor, a worm gear carried by and rotatable with said axle, a shaft, a worm thereon enmeshed with said worm gear, a power shaft projecting beyond one end of the container, a gearing connecting said power shaft with said worm shaft, means whereby said gearing may be actuated to disconnect said power shaft from said worm shaft, a lever handle idly mounted upon said power shaft, and a clutch mechanism whereby said lever handle may be alternately connected with, and disconnected from, said power shaft and permit manual power in succeeding impulses to be applied to said shaft.

2. A less than carload freight container embodying therein driving wheels, an axle therefor, a worm gear carried by and rotatable with said axle, a shaft, a worm thereon enmeshed with said worm gear, a power shaft projecting beyond one end of the container, a gearing connecting said power shaft with said worm shaft, means whereby said gearing may be actuated to disconnect said power shaft from said worm shaft, a lever handle idly mounted upon said power shaft, a clutch mechanism whereby said lever handle may be alternately connected with, and disconnected from, said power shaft and permit manual power in succeeding impulses to be applied to said shaft, and a pawl and ratchet mechanism operative upon said power shaft to prevent reverse movement of said power shaft while said lever handle is disconnected therefrom.

3. A less than carload freight container embodying therein driving wheels, an axle therefor, a worm gear carried by and rotatable with said axle, a shaft, a worm thereon enmeshed with said worm gear, a power shaft projecting beyond one end of the container, a change speed gearing, whereby said power shaft may be connected with, or disconnected from, said worm shaft, said gearing consisting of a fixed gear carried by each of said shafts, and a movable gear carried by each of said shafts and adapted to be brought into or out of mesh with the fixed gear upon the other shaft, and means whereby each movable gear may be selectively moved into or out of mesh with its co-operating gear, a lever handle idly mounted upon said power shaft, and a clutch mechanism whereby said lever handle may be connected with, or disconnected from, said power shaft.

4. A less than carload freight container embodying therein driving wheels, an axle therefor, a worm gear carried by and rotatable with said axle, a hollow shaft, a worm thereon enmeshed with said worm gear, a hollow power shaft projecting beyond one end of the container, a change speed gearing whereby said power shaft may be connected with, or disconnected from, said worm shaft, said gearing consisting of a fixed gear carried by each of said shafts, a gear movable longitudinally of each of said shafts and adapted to be brought into or out of mesh with the fixed gear upon the other shaft, rods extending from end to end of the container slidably mounted within said hollow shafts respectively, means connecting each movable gear with the rod within the shaft carrying same, each of said hollow shafts having a slot adjacent the movable gear, and a feather carried by said gear and passing through said slot, a lever handle idly mounted upon said power shaft, and a clutch mechanism whereby said lever handle may be connected with, or disconnected from, said power shaft.

5. A less than carload freight container embodying therein driving wheels, an axle therefor, a worm gear of high pitch carried by and rotatable with said axle, a shaft, a worm of high pitch thereon enmeshed with said worm gear, whereby turning of said axle is permitted when said shaft is under no restraint a power shaft projecting beyond one end of the container, a change speed gearing, whereby said power shaft may be connected with, or disconnected from, said worm shaft, said gearing consisting of a fixed gear carried by each of said shafts, and a movable gear carried by each of said shafts and adapted to be brought into or out of mesh with the fixed gear upon the other shaft, and means whereby each movable gear may be selectively moved into or out of mesh with its co-operating gear, a lever handle idly mounted upon said power shaft, and a clutch mechanism whereby said lever handle may be connected with, or disconnected from, said power shaft.

6. A less than carload freight container embodying therein driving wheels, an axle therefor, a worm gear carried by and rotatable with said axle, a shaft, a worm thereon enmeshed with said worm gear, a power shaft projecting beyond one end of the container, a gearing connecting said power shaft with said worm shaft, a lever handle idly mounted upon said power shaft, a clutch mechanism whereby said lever handle may be connected with, or disconnected from, said power shaft, a double acting ratchet wheel carried by said power shaft, spring pressed detent pawls upon opposite sides of said ratchet wheels, a crank arm pivotally mounted adjacent each pawl, a link connecting said crank arms, a shaft extending from end to end of the container, and a crank arm carried thereby pivotally connected with said link, whereby irrespective of the direction of movement of the container, a reverse movement of the power shaft while said lever handle is disconnected therefrom, may be prevented.

7. A less than carload freight container embodying therein driving wheels, an axle therefor, a worm gear carried by and rotatable with said axle, a hollow shaft, a worm thereon enmeshed with said worm, a hollow power shaft projecting beyond one end of the container, a change speed gearing whereby said power shaft may be connected with, or disconnected from, said worm shaft, said gearing consisting of a fixed gear carried by each of said shafts, a gear movable longitudinally of each of said shafts and adapted to be brought into or out of mesh with the fixed gear upon the other shaft, rods extending from end to end of the container slidably mounted within said hollow shafts respectively, means connecting each movable gear with the rod within the shaft carrying same, each of said hollow shafts having a slot adjacent the movable gear, and a feather carried by said gear and passing through said slot, a lever handle idly mounted upon said power shaft, a clutch mechanism whereby said lever handle may be connected with, or disconnected from, said power shaft, and a pawl and ratchet mechanism operative upon said power shaft to prevent reverse movement of said shaft while said lever handle is disconnected therefrom.

8. A less than carload freight container embodying therein driving wheels, an axle therefor, a worm gear carried by and rotatable with said axle, a hollow shaft, a worm thereon enmeshed with said worm gear, a hollow power shaft projecting beyond one end of the container, a change speed gearing whereby said power shaft may be connected with, or disconnected from, said worm shaft, said gearing consisting of a fixed gear carried by each of said shafts, a gear movable longitudinally of each of said shafts and adapted to be brought into or out of mesh with the fixed gear upon the other shaft, rods extending from end to end of the container slidably mounted within said hollow shafts respectively, means connecting each movable gear with the rod within the shaft carrying same, each of said hollow shafts having a slot adjacent the movable gear, and a feather carried by said gear and passing through said slot, a lever handle idly mounted upon said power shaft, a clutch mechanism whereby said lever handle may be connected with, or disconnected from, said power shaft, a double acting ratchet wheel carried by said power shaft, spring pressed detent pawls upon opposite sides of said ratchet wheels, a crank arm pivotally mounted adjacent each pawl, a link connecting said crank arms, a shaft extending from end to end of the container, and a crank arm carried thereby pivotally connected with said link, whereby irrespective of the direction of movement of the container, a reverse movement of the power shaft while said lever handle is disconnected therefrom, may be prevented.

9. A less than carload freight container embodying therein driving wheels, an axle therefor, a worm gear of high pitch carried by and rotatable with said axle, a shaft, a worm of high pitch thereon enmeshed with said worm, a power shaft projecting beyond one end of the container, gearing connecting said power shaft with said worm shaft, means whereby said gearing may be disconnected from said worm shaft to permit turning of said axle when said worm shaft is under no restraint, a lever handle idly mounted upon said power shaft, and a clutch mechanism whereby said lever handle may be alternately connected with, and disconnected from, said power shaft and permit manual power in succeeding impulses to be applied to said shaft.

GEORGE L. BENNETT.